(12) United States Patent
Peccetti

(10) Patent No.: US 11,084,246 B2
(45) Date of Patent: Aug. 10, 2021

(54) HONEYCOMB SANDWICH SHEET OR PANEL, BASED ON POLYPROPYLENE, WITH A NUMBER OF CENTRAL THERMOFORMED FILMS

(71) Applicant: COLINES S.P.A., Novara (IT)

(72) Inventor: Eraldo Peccetti, Novara (IT)

( * ) Notice: Subject to any disclaimer, the term of this patent is extended or adjusted under 35 U.S.C. 154(b) by 65 days.

(21) Appl. No.: 15/576,819

(22) PCT Filed: Jun. 6, 2016

(86) PCT No.: PCT/EP2016/062787
§ 371 (c)(1),
(2) Date: Nov. 26, 2017

(87) PCT Pub. No.: WO2016/198355
PCT Pub. Date: Dec. 15, 2016

(65) Prior Publication Data
US 2018/0162090 A1   Jun. 14, 2018

(30) Foreign Application Priority Data

Jun. 11, 2015   (IT) .......................... UB2015A001279

(51) Int. Cl.
*B32B 3/28*       (2006.01)
*B32B 27/08*      (2006.01)
(Continued)

(52) U.S. Cl.
CPC ................. *B32B 3/28* (2013.01); *B29B 7/90* (2013.01); *B29C 48/0017* (2019.02); *B29C 48/0021* (2019.02); *B29C 48/022* (2019.02); *B29C 48/21* (2019.02); *B29C 51/002* (2013.01); *B29C 51/02* (2013.01); *B29C 65/028* (2013.01); *B29C 66/1122* (2013.01); *B29C 66/438* (2013.01); *B29C 66/5346* (2013.01); *B29C 66/54* (2013.01); *B29C 66/71* (2013.01);
(Continued)

(58) Field of Classification Search
CPC ... B29C 48/0017; B29C 48/022; B29C 48/21; B29C 48/0021; B29C 7/90; B29C 51/002; B29C 51/02; B32B 27/08; B32B 27/20; B32B 27/32; B32B 37/06; B32B 37/182; B32B 7/05; B32B 3/28; B32B 29/08; B29B 7/90; B29D 99/0089
USPC ................................... 156/199–210, 244.15; 264/211.12–211.24; 428/174–186, 515
See application file for complete search history.

(56) References Cited

U.S. PATENT DOCUMENTS

| 6,004,651 | A | 12/1999 | Von Montgelas et al. |
| 2005/0126852 | A1* | 6/2005 | Nakajima ............... B29C 51/24 181/293 |
| 2006/0054531 | A1* | 3/2006 | Lombardini .......... B29C 66/723 206/591 |

FOREIGN PATENT DOCUMENTS

| EP | 1491327 | 12/2004 |
| WO | 2004043688 | 5/2004 |

(Continued)

*Primary Examiner* — Maria V Ewald
*Assistant Examiner* — Ethan Weydemeyer
(74) *Attorney, Agent, or Firm* — Themis Law

(57) ABSTRACT

A honeycomb sandwich sheet or panel, based on thermoplastic polypropylene, includes a structure having two flat outer films, at the top and bottom, welded to at least two inner or central thermoformed blister films, repeated in a regular and continuous pattern, wherein the at least two inner thermoformed films are welded to each other.

11 Claims, 5 Drawing Sheets

Figure 1:
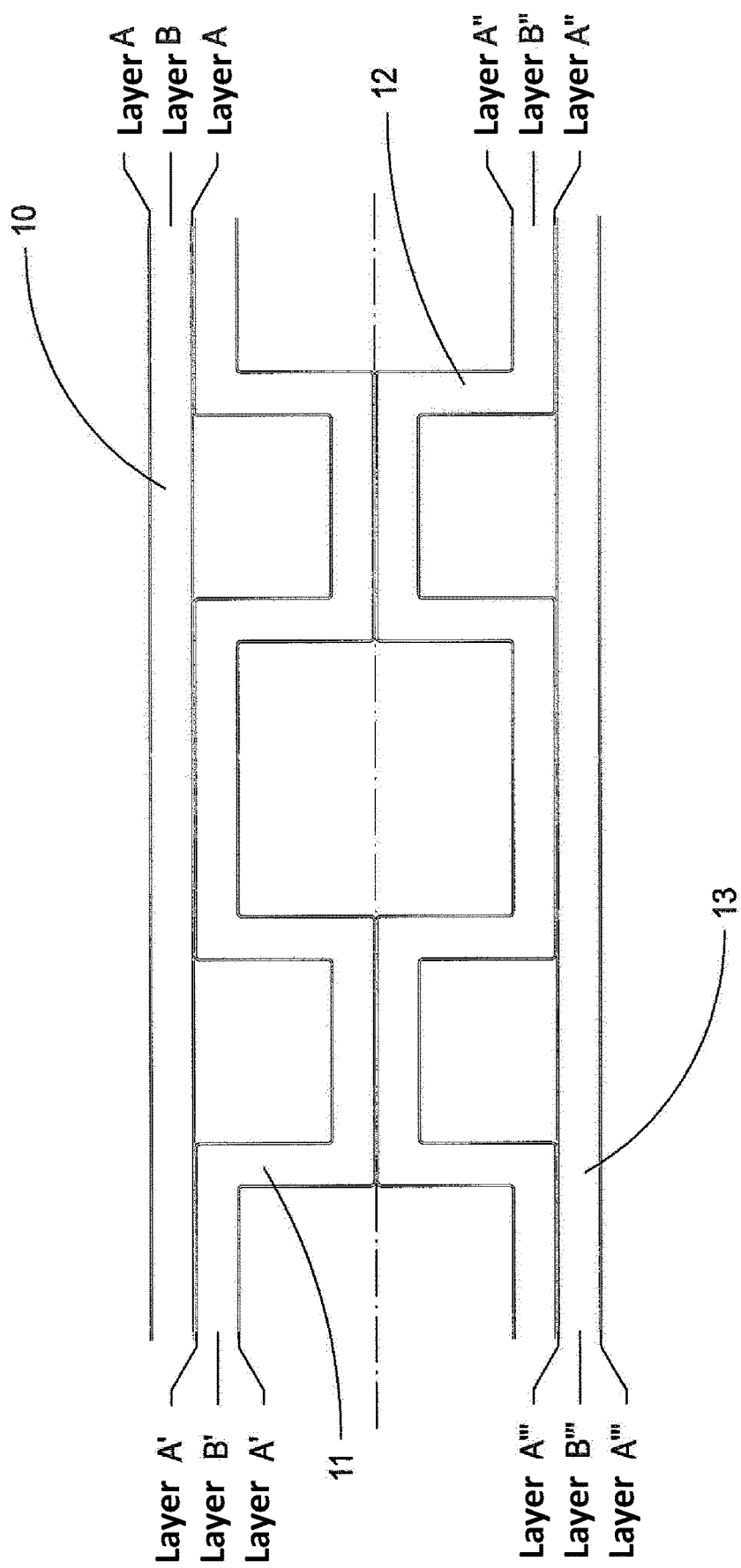

(51) Int. Cl.
  B32B 27/32  (2006.01)
  B32B 37/18  (2006.01)
  B32B 37/06  (2006.01)
  B32B 7/05   (2019.01)
  B29C 48/00  (2019.01)
  B29C 48/21  (2019.01)
  B32B 27/20  (2006.01)
  B29C 51/02  (2006.01)
  B32B 7/14   (2006.01)
  B29C 65/00  (2006.01)
  B29D 99/00  (2010.01)
  B32B 37/14  (2006.01)
  B32B 37/15  (2006.01)
  B29C 69/00  (2006.01)
  B29C 65/02  (2006.01)
  B29B 7/90   (2006.01)
  B29C 51/00  (2006.01)
  B29C 51/22  (2006.01)
  B29L 31/60  (2006.01)
  B29K 23/00  (2006.01)
  B29L 7/00   (2006.01)

(52) U.S. Cl.
  CPC ...... *B29C 66/725* (2013.01); *B29C 66/73921* (2013.01); *B29C 66/83411* (2013.01); *B29C 66/83413* (2013.01); *B29C 66/83511* (2013.01); *B29C 66/843* (2013.01); *B29C 69/00* (2013.01); *B29D 99/0089* (2013.01); *B32B 7/05* (2019.01); *B32B 7/14* (2013.01); *B32B 27/08* (2013.01); *B32B 27/20* (2013.01); *B32B 27/32* (2013.01); *B32B 37/06* (2013.01); *B32B 37/146* (2013.01); *B32B 37/153* (2013.01); *B32B 37/182* (2013.01); *B29C 51/225* (2013.01); *B29C 66/53461* (2013.01); *B29C 66/53462* (2013.01); *B29C 2791/007* (2013.01); *B29K 2023/12* (2013.01); *B29L 2007/002* (2013.01); *B29L 2031/608* (2013.01); *B32B 2250/242* (2013.01); *B32B 2250/40* (2013.01); *B32B 2323/10* (2013.01); *B32B 2553/00* (2013.01); *B32B 2553/026* (2013.01); *B32B 2571/00* (2013.01)

(56) References Cited

FOREIGN PATENT DOCUMENTS

| WO | 2004113073 | 12/2004 |
| WO | 2005105436 | 11/2005 |

\* cited by examiner

HONEYCOMB SANDWICH SHEET OR PANEL, BASED ON POLYPROPYLENE, WITH A NUMBER OF CENTRAL THERMOFORMED FILMS

The present invention relates to a honeycomb sandwich sheet or panel, based on polypropylene, with a number of central thermoformed films, the process and apparatus for producing said sheet.

Honeycomb or blister sandwich sheet or panel refers to a honeycomb sheet, preferably made of polypropylene, that can have a grammage, i.e. weight per square metre, typically ranging from 200 to 4000 g/m² approximately. This product has specific characteristics such as a considerable rigidity and hardness, even in the presence of a good resilience (i.e. fracture strength). It also has a fill factor, i.e. ratio between the volume of plastic material with respect to the total volume occupied by the product, of 30÷50%.

Thanks to this particular honeycomb structure, blister sheet has a particularly interesting resistance/specific weight ratio; in particular, this feature is of particular interest and importance in the packaging field, where there is a specific tendency towards progressively reducing the weight of the packaging product, thus eliminating the overpackaging phenomenon.

The current state of the art describes and uses honeycomb or blister sheets or panels which, very schematically, consist in the hot joining of three different films, of which one (the central film) is a thermoformed film. As a result of said thermoforming, the central film acquires the characteristic honeycomb form, this guaranteeing a significant increase in the static moment of inertia in the three directions and therefore increasing the relative resistance modules.

The particular conformation of the central film gives the end product mechanical properties (rigidity, load resistance, etc.) and functional properties (lightness, malleability, etc.), that in recent years have led to the use of a blister panel or sheet in various applications, with excellent results.

The product, as briefly described above, however, has some significant critical aspects, "physiological" so to speak, which are inherent in its very structure, i.e. a considerable asymmetry, revealed in a sectional view, and great difficulty in guaranteeing the correct characteristics of levelness and resistance in the case of high grammages (typically over 2000 g/m²) of the product.

In other words, the evident and inevitable asymmetry of thermoformed sheets or films has repercussions on the end product, causing a series of well-known drawbacks, whereas the difficulty in producing so-called "heavy" sheets or panels restricts and limits their use in applications for which they are conceptually ideal.

The above asymmetry can first of all be noted in a cooling process of the two sides of the thermoformed sheet, which follow two different timeframes due to the different mass involved: the thermoformed side, or blister, in fact, due to the same thermoforming process, becomes thinner, losing mass with respect to the bottom and requiring less time for cooling.

As a result, after the subsequent welding of the thermoformed sheet with the two outer sheets, the different elastic shrinkage of the two sides of the thermoformed sheet, specifically due to the different masses involved, causes a kind of curling effect, i.e. a transversal curvature, in the end product which, in fact, makes the sheet or panel unusable.

Various procedures, methods and apparatuses have been studied and developed, which have proposed to correct this defect, but the problem of the natural asymmetry of the end product basically remains, and is also manifested in the different finish of the two outer sides of the sheet, i.e. the outer side welded to the blister side of the thermoformed sheet often has the imprint of the blisters themselves, consequently making the final panel or sheet unusable for high-quality applications.

A partial solution to this latter problem is described in patent application MI2014A001110: this describes a honeycomb sheet or panel based on thermoplastic polypropylene, comprising a structure consisting of two flat outer films, thermowelded to a central film consisting of a thermoformed blister film repeated in a regular and continuous pattern, the two flat outer films being composed of a coextruded two-layer film (AB), based on thermoplastic polypropylene, wherein the internal layer (A) faces the central thermoformed film, and the central thermoformed blister film is composed of a coextruded three-layer film (ABA), based on thermoplastic polypropylene, wherein the two outer layers (A) face the flat outer films and said structure also envisages a further layer C thermowelded to the outer layer B of the two flat outer films.

The process and apparatus that represent the state of the art closest to the present invention are described in EP1638770. The process described in EP'770 envisages the production of a blister sheet with the following passages: extrusion of an upper or bottom film, a central film and a lower or top film, starting from the corresponding granule; thermoforming of the central film; calibration and partial cooling of the bottom and top film; heating of at least one side of the bottom and top film and coupling of the two bottom and top films to the thermoformed film. This process is carried out in an apparatus that comprises at least three extrusion heads, which form the extrusion group, followed by a thermoforming group and calibration and cooling groups, the thermoforming group and calibration and cooling groups in turn being connected to a coupling group. This process, which already allows a high-quality product to be obtained, does not completely solve the problems indicated herein, as the central thermoformed sheet in any case has a basic asymmetry, which creates the necessity of using additional stabilization and tempering devices (so-called hot-air and cold-air ovens) downstream of the extrusion and forming process described above.

Furthermore, in the case of sheets or panels having a high grammage and a high thickness, a physical limitation to their production is also linked to the thermoformability of the material used, which comprises not only the polymer (i.e. the polypropylene mentioned above) but also mineral fillers such as calcium carbonate, with the double objective of increasing the resistance characteristics of the end product and reducing the material cost.

On the one hand, the necessity of having materials with an extremely high elastic modulus, i.e. that require considerable force for causing a small elongation, limits the possibilities of effecting "deep" thermoformings, i.e. thermoformings necessary for the production of sheets having a high thickness and grammage.

A further aspect to be taken into consideration is the necessity of "charging" the polymer with mineral fillers in different percentages, typically from 10% to 60% by weight, which creates a further limitation, i.e. the necessity of using so-called "compounds", i.e. compounds of mineral fillers and polymer (in this case polypropylene), previously mixed and extruded in the form of granules. This process is currently effected off-line by granulating machines.

Furthermore, in the case of the use of compound granules, the producer of sheets, i.e. of the end product, is compelled to avail of an extremely large stock of raw materials: he must in fact have at his disposal granules with various concentrations of material charged for different uses, consequently a necessity that requires the availability of numerous, different lots of compounds, each characterized by a different concentration of the filler and/or a different mineral filler. This also affects the sheet producer with respect to the suppliers of these compounds: he will generally be compelled to have a limited choice of both suppliers and compounds with different concentration percentages of mineral fillers, of the same supplier.

The present invention proposes to provide a sandwich sheet or panel made of thermoplastic material, which overcomes the drawbacks of the known art.

More specifically, the objective of the present invention is to provide a honeycomb sandwich sheet or panel, based on thermoplastic polypropylene, composed of outer films (or sides), joined to a central layer (or core) which comprises thermoformed blister films having a cylindrical form or other forms (honeycomb structure) repeated in a regular and continuous pattern, wherein the particular conformation of the central layer gives the sheet mechanical properties, load resistance and structural and functional characteristics.

An objective of the present invention is therefore to provide a honeycomb sandwich sheet or panel, based on polypropylene, that has the specific characteristics of the sheet object of patent application MI2014A001110, at the same time eliminating the drawbacks previously described.

An objective of the present invention is therefore to provide a honeycomb sandwich sheet or panel, characterized by a much greater thermoforming depth with respect to the thermoformed sheets or panels according to the state of the art, typically a double forming depth.

A further objective of the present invention is to provide a honeycomb sandwich sheet or panel with a complete symmetry of the structure of the thermoformed blister sheet or panel.

Finally, objectives of the present invention are a process and apparatus for producing the honeycomb sandwich sheet or panel that also allow the use of mineral fillers directly in powder form.

An object of the present invention relates to a honeycomb sandwich sheet or panel, based on thermoplastic polypropylene, comprising a structure consisting of two flat outer films, at the top and bottom, welded to at least two inner or central thermoformed blister films, repeated in a regular and continuous pattern, wherein said at least two inner thermoformed films are welded to each other, said sheet or panel being characterised in that said flat outer and inner thermoformed films are composed of three coextruded layers.

The inner thermoformed films are present in an even number, equal to or higher than two, and are preferably two or four, even more preferably two.

The inner thermoformed films can be welded to each other directly or through the interpositioning of a flat non-thermoformed film.

The at least two inner thermoformed films can be welded to each other by means of a "blister-to-blister" welding, or a "bottom-to-bottom" welding, preferably by means of a "blister-to-blister" welding.

The flat non-thermoformed film that can be interpositioned between the two central thermoformed films preferably has the same structure with three co-extruded films and composition as the flat outer films.

In the following description, unless otherwise specified, the term "honeycomb sheet or panel" refers to a structure composed of flat non-thermoformed films and thermoformed films welded to each other, the term "films" refers to the single thermoformed or non-thermoformed elements that form the sheet, the term "layer" refers to the elements forming the film.

Each film consists of three coextruded layers, whereas each sheet or panel is composed of at least two non-thermoformed films and at least two thermoformed films extruded contemporaneously.

In particular, the honeycomb or blister sheet or panel according to the present invention consists, as already indicated, of a flat upper or top outer film, two (or four, or six, etc.) central thermoformed films and a flat lower or bottom outer film.

Each single film is preferably composed of three layers, for example according to the structures A-B-A, A-B-C, C-B-A and all combinations thereof.

It is not necessary for all the layers A, B or C, forming the different films to come from the same extruder (i.e. extruder A, or B, or C), but the presence of the same number of extruders as the layers forming the whole of the final sheet can be envisaged. In other words, if the final sheet has a structure consisting of A-B-A+A'-B'-A'+A"-B"-A"+A'''-B'''-A''', there can be an extruder A for the layer A, an extruder B for the layer B, an extruder A' for the layer A', an extruder B' for the layer B', and so forth.

The flat outer films preferably consist of films of polypropylene copolymer (preferably a block or random polypropylene copolymer, with ethylene and/or butane monomers inserted in the propylene chains) and homopolymer and/or relative mixtures, said films having chemical properties that make them particularly suitable for hot coupling, at the same time ensuring a high adhesion and relatively low welding temperatures. This is therefore a multilayer structure produced in coextrusion with three layers, wherein the three-layer coextruded structure A-B-A is preferably composed of an internal layer B of polypropylene homopolymer and two outer layers A of polypropylene copolymer.

In the case of coextruded multilayer structures A-B-C or C-B-A or combinations thereof, the structure is the result of the coextrusion of three different polymers coming from three different extruders, the two outer layers of the film A and C can therefore be composed of different types of polypropylene, whether they be polypropylene homopolymers, copolymers, or of any other nature.

The possibility/necessity of having three different polymers in the films that form the flat outer films of the sheet or panel according to the present invention, depends on the fact that, in some applications, the outermost layer of the film can be coupled with possible further outer films: consequently, depending on the structure selected, it can be the layer A or C, and may have to meet particular physical/chemical characteristics, bearing in mind the requirement that the layer of flat outer film directly welded to the inner or central thermoformed film, must have weldability characteristics suitable for guaranteeing the perfect adhesion between said thermoformed film and non-thermoformed film.

These considerations are obviously valid for both of the flat outer films.

The inner thermoformed films preferably consist of polypropylene copolymer (preferably a block or random polypropylene copolymer, with ethylene and/or butane monomers inserted in the propylene chains) and homopolymer and/or relative mixtures, having particularly high physico-mechanical properties, and therefore suitable for guaranteeing that the end product, i.e. the honeycomb or blister panel or sheet, has the desired qualities from the point of view of mechanical resistance and lightness. This is therefore a film with multilayer structure produced in coextrusion with three layers, wherein the three-layer coextruded structure A-B-A is preferably composed of an internal layer B of polypropylene homopolymer and two outer layers A of polypropylene copolymer.

The outer layers of the flat outer films and inner thermoformed films, the same as or different to each other, are preferably made of polypropylene copolymer and the inner layers of the flat outer films and inner thermoformed films are preferably made of polypropylene homopolymer, possibly with the addition of mineral fillers.

An object of the present invention also relates to a process for the production of a honeycomb sandwich sheet or panel which comprises the following phases:
a) contemporaneous extrusion of at least four multilayer films, starting from a corresponding polymer or from a corresponding polymer compound and mineral filler: an outer bottom film, at least two inner or central films, and an outer top film;
b) thermoforming of said at least two inner or central films;
c) coupling by means of thermowelding of said non-thermoformed flat outer films with said two inner or central thermoformed films,
wherein said inner thermoformed films are welded to each other according to a blister-to-blister or bottom-to-bottom arrangement, and wherein the extrusion phase of the films and the beginning of the coupling phase are contemporaneous for all the outer and inner, thermoformed and non-thermoformed films.

The process for the production of a honeycomb sandwich sheet or panel according to the present invention can also comprise, upstream of phase a), a mixing phase of polypropylene and mineral filler in powder form, to form the compound in granule form to be used in the subsequent phase a).

Furthermore, the process that envisages said further mixing phase, can be carried out in continuous, introducing one or more twin-screw extruders prior to the extrusion head(s), so as to feed the process directly with pure polypropylene granules and powder of mineral fillers, such as for example, calcium carbonate, fiberglass or the like.

As already specified, the at least two inner thermoformed films can be welded to each other with a "blister-to-blister" or "bottom-to-bottom" welding. In this way, a honeycomb sheet or panel is finally obtained, composed of four films, of which two central thermoformed films, which are absolutely and completely symmetrical.

Analogously, honeycomb sheets or panels can be produced using a plurality, again in an even number, of thermoformed films (2, 4, 6, etc.).

FIG. 1 enclosed represents an example of a honeycomb sheet or panel according to an embodiment of the present invention.

An essential aspect of the process according to the present invention is that the production of this type of sheet or panel takes place in contemporaneous regime conditions: this means that all the elements (i.e. all the films, thermoformed and non-thermoformed) must be produced at the same moment, in order to guarantee the necessary symmetry, not only geometrical (relatively simple to obtain), but also and above all a thermal symmetry.

These elements, in fact, must not only be produced at the same moment, but they must also reach the couplings under substantially similar thermal conditions, specifically to guarantee the thermal symmetry.

The film run (i.e. the path followed by all of the films) is extremely important and has been specifically conceived so that the films reach the coupling phase with substantially similar characteristics.

The term substantially similar characteristics means that each film reaches the coupling phase at a temperature ranging from −10° C. to +10° C. with respect to the welding temperature of the material used, or that the differences in temperature between the films reaching the coupling phase are lower than 10° C. approximately.

Figure 2:
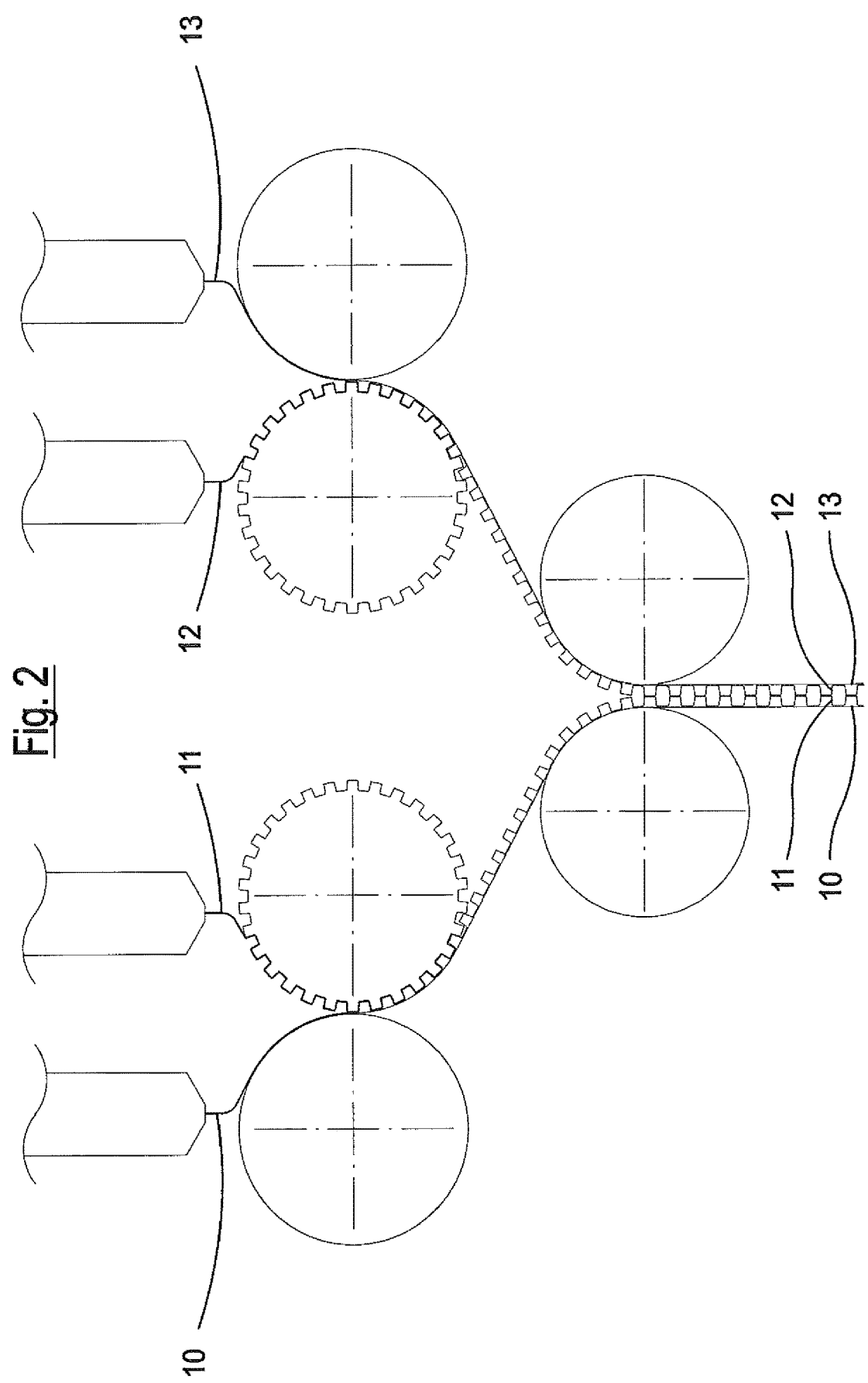
Figure 3:
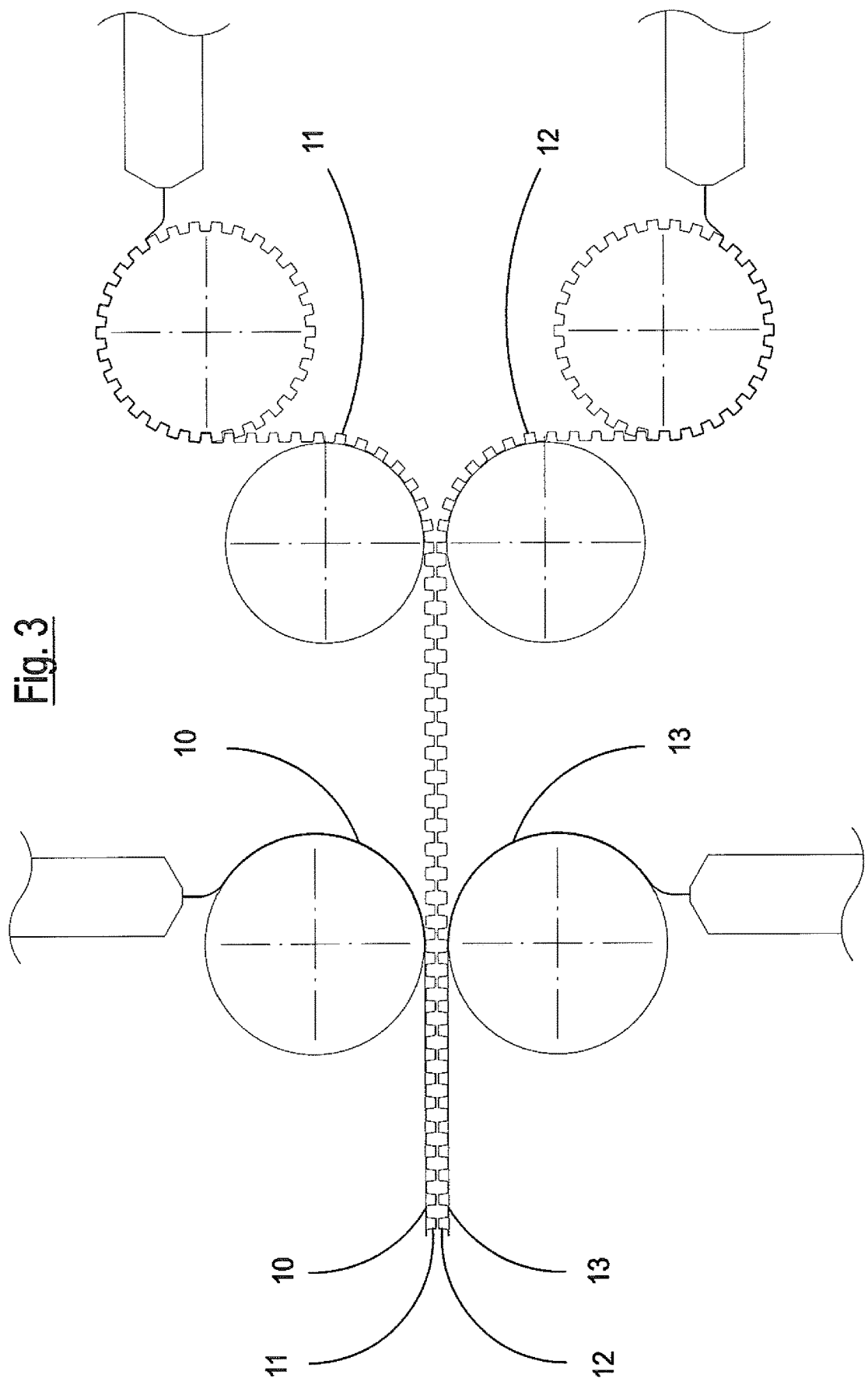
Figure 4:
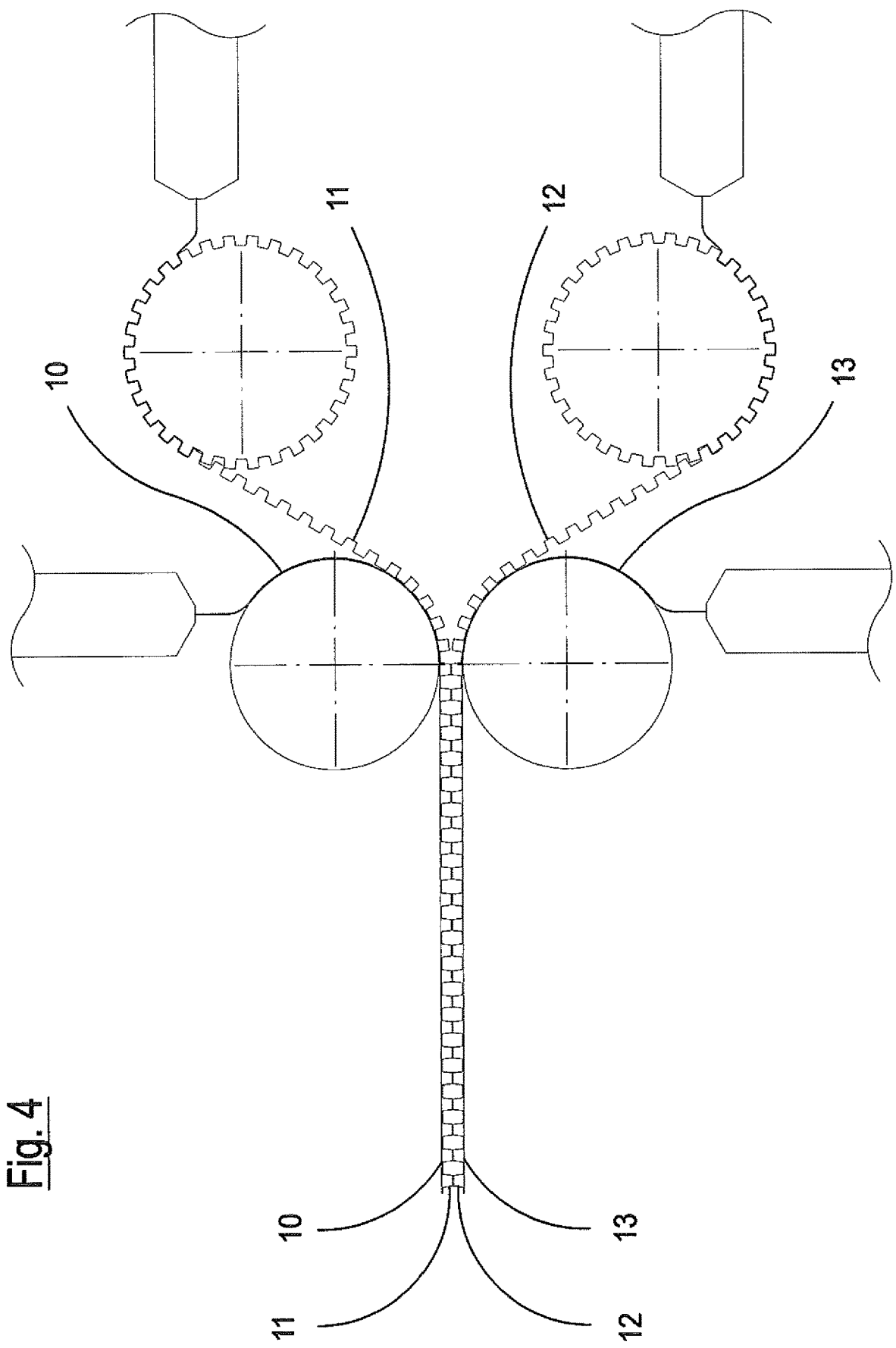

In particular, the thermoforming can be either mechanical or under vacuum and the welding of the four (or six, or eight, etc.) films can take place according to the four embodiments of the process for the production of the panel or sheet according to the present invention, described in the enclosed FIGS. 2-5, according to the following procedures:

welding first a smooth outer film 10 to an inner thermowelded film 11 and, contemporaneously, a second smooth outer film 13 to a second inner thermoformed film 12; then welding the two pairs of films or intermediate elements 10-11 and 12-13 thus obtained, to each other, blister-to-blister (or bottom-to-bottom, depending on the requirements of the final application), until the end product is obtained, i.e. the honeycomb sheet or panel 10-11-12-13 (shown in FIG. 2);

welding first the two inner thermoformed films 11 and 12 to each other, by mechanical action or under vacuum, blister-to-blister (or bottom-to-bottom depending on the requirements of the final application), then welding, in a single step, the two smooth outer films 10 and 13, onto the intermediate element 11-12, until the end product is obtained, i.e. the honeycomb sheet or panel 10-11-12-13 (shown in FIG. 3);

welding all four (or six, or eight, etc.) films in a single step, of which the two outermost films 10 and 13, smooth, and the two inner or central films 11 and 12, thermoformed by mechanical action or under vacuum, superimposing them blister-to-blister (or bottom-to-bottom depending on the requirements of the final application), until the end product is obtained, i.e. the honeycomb sheet or panel 10-11-12-13 (shown in FIG. 4).

The coupling phase by means of thermowelding c) described above is then effected by welding the films 10,11, 12,13 to each other, wherein each film 10,11,12,13 reaches said coupling phase at a temperature ranging from −10° C. to +10° C. with respect to the welding temperature of the outer layer of the same film 10,11,12,13 or the films 10,11, 12,13 reach the coupling phase at temperatures which differ from each other by a value lower than 10° C.

A fundamental advantage, however, of the honeycomb sheet or panel according to the present invention is the perfectly symmetrical structure and a thermoforming depth which is at least double with respect to a solution with a single thermoformed film, obviously with the same raw material used (and therefore thermoformability characteristics).

Figure 5:
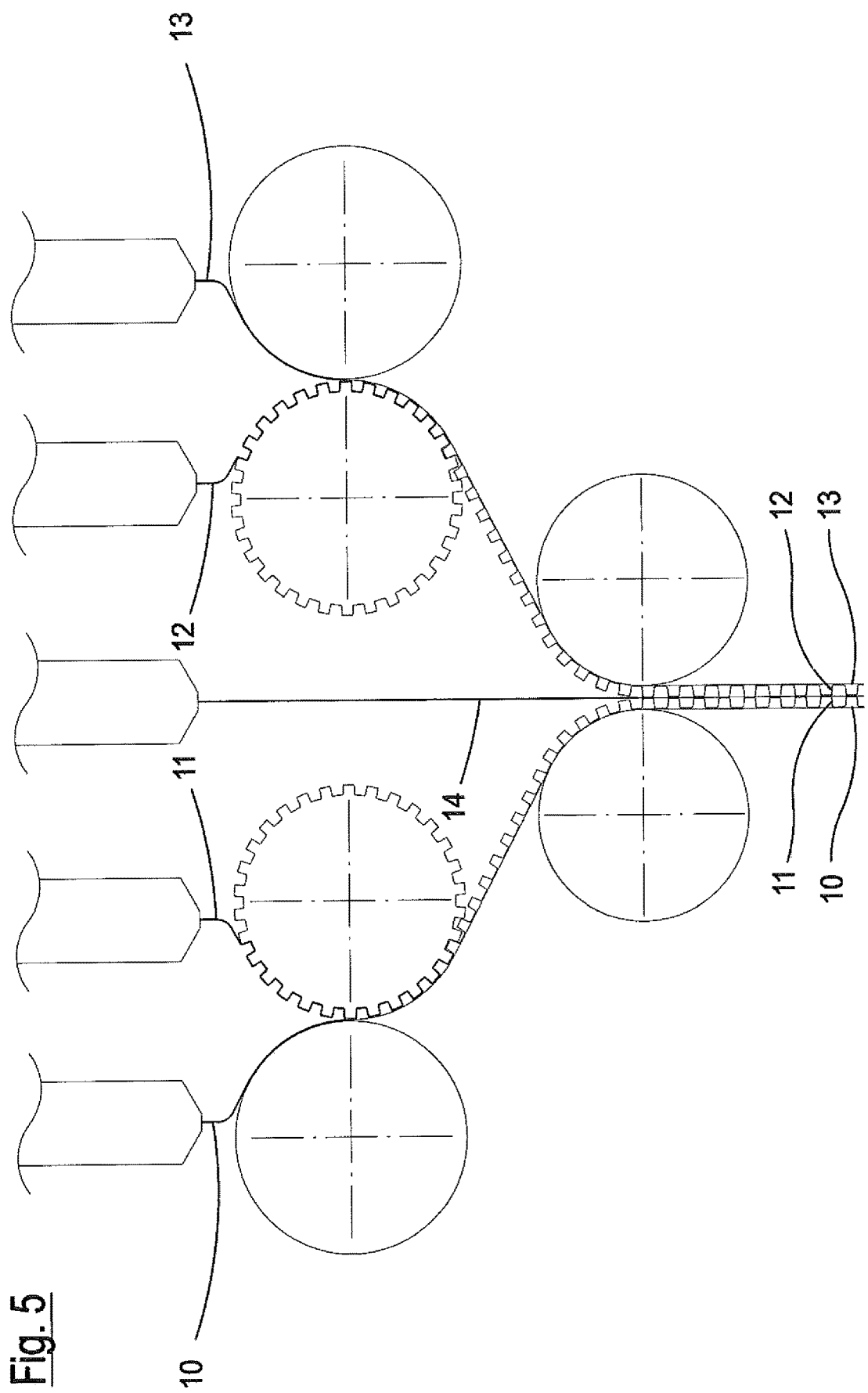

In all the embodiments described above (FIGS. 2-4), a further flat film 14 can be envisaged, positioned between the two inner or central thermoformed films 11 and 12, which improves and guarantees the perfect adhesion of all the films forming the structure 10,11,12,13 of the honeycomb sheet or panel according to the present invention (shown in FIG. 5).

Furthermore, the versatility of the process according to the present invention also allows sheets or panels that are intentionally asymmetrical to be obtained, by simply welding the two (or four, or six, etc.) thermoformed films 11 and 12, blister on bottom or viceversa; sheets or panels can therefore be obtained that are interesting however for applications that do not require a complete symmetry, but that in any case require a thermoforming depth which is at least double with respect to what is currently available with the products of the state of the art available on the market.

A further object of the present invention also relates to an apparatus for the production of a honeycomb or blister sheet or panel, said apparatus comprising an extrusion group consisting of at least four extrusion heads, downstream of said extrusion group there being at least two thermoforming groups with relative calibration and cooling groups, the thermoforming groups and the calibration and cooling groups being connected, in turn, to one or more coupling groups.

Said apparatus can also comprise one or more twin-screw extruders upstream of the extrusion group.

A further object of the present invention relates to the use of the honeycomb blister sheet or panel according to the present invention, as a protection element or packaging element.

As already observed, a fundamental advantage of the honeycomb sheet or panel according to the present invention is the perfectly symmetrical structure and a thermoforming depth which is at least double with respect to a solution with a single thermoformed film.

One of the advantages of the process for the production of the honeycomb or blister sheet or panel according to the present invention consists in the production of the panel by means of a single production step, wherein single production step means that the final sheet or panel is produced in a single plant starting from the raw material (i.e. the granule), without the production of semifinished products, with a consequent lower energy consumption and, indirectly, with a lesser environmental impact, above all thanks to the drastic reduction in waste products.

A further advantage is represented by the absence of delamination thanks to the absolute adhesion specifically guaranteed by the fact that each single film forming the sheet or panel according to the present invention is composed of three layers contemporaneously extruded by means of a coextrusion process.

In this way, another problem present in the products and processes according to the state of the art can also be limited, if not completely eliminated, i.e. the necessity of finding a mixture of materials that has good physico-mechanical characteristics and at the same time allows a coupling at relatively low temperatures, without the risk of detachment of the films forming the honeycomb blister panel or sheet.

A mixture of materials that satisfies these requirements is inevitably the result of a compromise between the requirements of the production process and the desired characteristics for the end product, i.e. the honeycomb sheet or panel, but both of these needs cannot clearly be 100% satisfied, as this is a compromise, as already mentioned.

In particular, as previously described, the honeycomb blister panel or sheet according to the present invention is composed of a flat outer upper or top film, two (or four, or six, etc.) inner or central thermoformed films and a flat outer lower or bottom film.

For higher grammages, as already indicated, the presence of mineral fillers is necessary, which are suitable for guaranteeing the correct mechanical resistance properties of the honeycomb blister panel or sheet, at the same time reducing the material cost of the end product.

Furthermore, the process for the production of the panel or sheet according to the present invention also allows the concentration of mineral fillers to be varied, without having to stock the corresponding compound, and above all it allows said fillers to be used in powder form, i.e. in their natural configuration state. This solution is enabled by the choice of a so-called twin-screw extruder for the extrusion of the layer(s) of coextruded films that comprise said mineral fillers.

In the apparatus according to the present invention, a twin-screw extruder can also be envisaged for the extrusion of the layer(s) that require mineral fillers. A single twin-screw extruder can be present, that can feed all the extrusion heads necessary for the production of the panel or sheet according to the present invention (typically not less than three, but there can be 4, 5, 6 and so on) with the use of the same number of gear pumps, or as many twin-screw extruders can be present as the layers of film forming the end product of the panel or sheet according to the present invention, that also require the presence of mineral fillers, coupling each extrusion head with a gear pump to guarantee the correct flow-rate of material also in the presence of high counter-pressures of the extrusion head, typical of these applications.

Further advantages of the process for the production of the honeycomb or blister panel or sheet according to the present invention are the following: first of all, this is a continuous process that starts from the granule and/or even from the polymer and powders of mineral fillers and directly produces the end product, i.e. the honeycomb sheet or panel, without intermediate passages. A stock of film reels is therefore not necessary, with relative economical advantages with respect to both the logistics and transportation.

It is also possible to directly produce any required grammage (obviously within a defined variation range) and with any colouring, practically "just in time", with a minimum product waste for obtaining the variation in thickness.

The process according to the present invention also allows a considerable energy saving deriving from the fact that all of the films involved in the process itself require little heating, thanks to the sufficiently high caloric content they maintain in close proximity of the various couplings.

The process according to the present invention also has the further advantage of envisaging the use of materials having high mechanical properties, as central layer of the three-layer coextruded product, which forms both the flat outer films and also the inner thermoformed films, without influencing the weldability of the single films.

Materials having high weldability characteristics can also be used as outer layers of the three-layer coextruded product, which forms both the flat outer films and also the inner thermoformed films, without influencing the mechanical properties of the end product.

Furthermore, the process according to the present invention has the definite advantage of minimizing waste products during the starting operations, as this is a continuous process, and also and above all at regime, thanks to the possibility of recycling the cut edges for preferably feeding the extruders of the central layers of the three-layer coextruded products, that form all of the films, without significant variations in the characteristics of the end product.

The honeycomb or blister panel or sheet according to the present invention is also characterized by the complete absence of residual internal stress, above all in the case of films having a completely symmetrical structure (i.e. where the thicknesses of the flat outer films are substantially equal and the inner thermoformed films are symmetrically positioned, i.e. blister-to-blister/bottom-to-bottom).

Furthermore, the honeycomb or blister panel or sheet has a high levelness, also thanks to the coupling of the films, which is obtained at temperatures close to the vicat temperature and thanks to the use of specific materials for the outer layers, which allow a strong adhesion also in the presence of relatively limited contact pressures, in addition of course to the fact that the couplings of the flat outer films are preferably effected with the bottom of the inner or central thermoformed films.

Finally, the process according to the present invention allows honeycomb sheets or panels with a high grammage and high thickness, typically over 2000 g/m², to be produced without any problems, thanks to the presence of a number of central thermoformed films that have a blister-to-blister/bottom-to-bottom coupling, therefore allowing a considerable increase in the total depth of the thermoforming, also in the presence of materials having a poor thermoformability, such as those used in the production in question, but which are necessary for guaranteeing the correct mechanical properties of the end product.

The sheet or panel according to the present invention has a weight ranging from 300 g/m² to 5000 g/m², preferably from 1000 g/m² to 4000 g/m².

The sheet or panel according to the present invention has a thickness ranging from 4.00 to 40.0 mm, preferably ranging from 10.00 to 30.00 mm.

The blisters present in the central thermoformed layer have a diameter ranging from 3.00 to 20.00 mm, preferably ranging from 4 to 15 mm and the height of the protrusions/blisters varies and depends on the diameter of the same, for example the height being 3.00 mm for a diameter of 3.5 mm and 10.00 mm for a diameter of 15.00 mm.

The layers A, B and C can have the same or different thickness and said thickness preferably ranges from 100 microns to 2 mm.

A sheet or panel according to the present invention is preferably composed of four films, of which two films (A-B-A and A'''-B'''-A''') are outer films and flat, welded to two films (A'-B'-A' and A''-B''-A'') thermoformed and welded blister-to-blister.

The sheet or panel represented in FIG. 1, has optimal stratification percentages for contemporaneously guaranteeing the correct weldability characteristics between the various films and possibly with additional films to be coupled with the outermost layers A and A''', and the correct mechanical properties in terms of crush resistance, flexural modulus and acoustic and thermal insulation. More specifically, both the two flat outer coextruded films A-B-A and A'''-B'''-A''', and also the two central thermoformed films A'-B'-A' and A''-B''-C'', have the following characteristics: the outer layers A, A', A'', A''' have a thickness, the same as or different from each other, ranging from 5 to 10% with respect to the total thickness of the corresponding coextruded film, whereas the central layers B, B', B'', B''' have a thickness, the same as or different from each other, ranging from 80 to 90% with respect to the total thickness of the corresponding coextruded film.

Furthermore, in the sheet or panel according to the present invention, in the embodiment according to FIG. 1, each flat outer film and each thermoformed inner film represents about 20-30% by weight with respect to the total weight of the sheet itself.

The flat outer films preferably have the same weight and the inner thermoformed films preferably have the same weight.

A specific example of a sheet or panel according to the present invention has the following features:

Sheet with a weight of 3000 g/m²;
Diameter of the blister deriving from the blister-to-blister coupling of the two inner thermoformed films: 14 mm;
Composition of the outer films (upper/flat A-B-A and lower/flat A'''-B'''-A'''):
Layer A, A''':
PP copolymer (fluidity index=3 g/10');
Layer B, B''':
PP homopolymer (fluidity index=3 g/10') and mineral fillers in a quantity equal to 20% by weight.

The inner or central thermoformed films A'-B'-A' and A''-B''-A'' envisage layers A' and A'' with the same composition as the layers A and A''' and layers B' and B'' with the same composition as the layers B and B''' of the outer films indicated above.

The sheet was produced by first welding the smooth outer film A-B-A to the inner thermoformed film A'-B'-A' (by means of the vacuum technology) and, contemporaneously, the second smooth outer film A'''-B'''-A''' to the second inner thermoformed film (by means of the vacuum technology) A''-B''-A''; the two pairs of intermediate elements A-B-A/A'-B'-A' and A''-B''-A''/A'''-B'''-A''' thus obtained, were then welded to each other, blister-to-blister, until the end product was obtained, i.e. the honeycomb sheet or panel A-B-A/A'-B'-A'/A''-B''-A''/A'''-B'''-A'''.

Weight distribution of the films with respect to the total weight of the sheet:
Upper film A-B-A/ central film A'-B'-A'/ central film A''-B''-A''/lower film A'''-B'''-A'''=30%-20%-20%-30%.

The panel obtained has a total weight equal to 3000 g/m².

The invention claimed is:

1. A honeycomb sandwich sheet or panel comprising:
a structure consisting of two flat outer films made from polypropylene, the two flat outer films being in top and bottom positions, and being welded to at least two inner thermoformed blister films made from polypropylene and disposed with a repeated, regular, and continuous pattern, each of the at least two inner thermoformed blister films having a plurality of blisters and a plurality of bottoms connected to the blisters by perpendicular walls,
wherein said at least two inner thermoformed films are welded to each other with a blister-to-blister welding, or a bottom-to-bottom welding, and
wherein the two flat outer and at least two inner thermoformed films each consist of three coextruded layers.

2. The honeycomb sandwich sheet or panel according to claim 1, wherein the at least two inner thermoformed films are present in an even number, equal to or higher than two.

3. The honeycomb sandwich sheet or panel according to claim 1, wherein the at least two inner thermoformed films are welded to each other directly.

4. The honeycomb sandwich sheet or panel according to claim 1,
wherein the flat outer and at least two inner thermoformed films are composed of three coextruded layers of a polypropylene copolymer and homopolymer or mixtures thereof.

5. A process for producing a honeycomb sandwich sheet or panel according to claim 1, comprising the following steps:
a) contemporaneously extruding at least four multilayer films (10,11,12,13), starting from a polymer compound, or a polymer compound and mineral filler, at least four multilayer films comprising an outer bottom film (10), at least two inner or central films (11,12), and an outer top film (13);

b) thermoforming said at least two inner or central films (11,12), each of the at least two inner or central films having a plurality of blisters and a plurality of bottoms connected to the blisters by perpendicular walls; and c) coupling, by thermowelding, said flat outer bottom and top films (10,13) with said at least two inner or central thermoformed films (11,12), wherein said at least two inner or central thermoformed films (11,12) are disposed in mirror position and are welded to each other according to a blister-to-blister or bottom-to-bottom arrangement, and wherein the step of extruding of the four multilayer films and a beginning of the step of coupling are contemporaneous for all the outer and at least two inner or central films (10,11,12,13).

6. The process according to claim 5, wherein the polymer compound comprises polypropylene, further comprising, upstream of step a), a mixing step of the polymer and a mineral filler in powder form to produce a granular compound, wherein the granular thus obtained is fed to said step a).

7. The process according to claim 5, wherein the coupling step by thermowelding c) is performed by:

welding first a smooth outer film (10) to an inner thermowelded film (11) and, contemporaneously, a second smooth outer film (13) to a second inner thermoformed film (12) to produce two pairs of films, then welding the two pairs of films (10-11) and (12-13) thus obtained, to each other, blister-to-blister or bottom-to-bottom; welding first the two inner thermoformed films (11 and 12) to each other, by mechanical action or under vacuum, blister-to-blister or bottom-to-bottom, then welding, in a single step, the first and the second smooth outer films (10 and 13) onto the two pairs of films (11-12); or welding all the outer and the inner films (10,11,12,13) in a single step, of which the first and the second outer films (10 and 13) and the two inner films (11 and 12), which are thermoformed by mechanical action or under vacuum, superimposing the two inner films blister-to-blister or bottom-to-bottom.

8. The process according to claim 5, wherein the coupling step by thermowelding c) is performed by welding the outer and the inner films (10,11,12,13) to each other, each film (10,11,12,13) reaching the coupling step at a temperature ranging from −10° C. to +10° C. with respect to a welding temperature of an outer layer of the same film (10,11,12,13), or the outer and the inner films (10,11,12,13) reach the coupling step at temperatures which differ from each other by a value lower than 10° C.

9. The process according to claim 5, further comprising the step of providing the honeycomb sandwich sheet or panel as a protection element or packaging element.

10. The honeycomb sandwich sheet or panel according to claim 4, wherein outer layers of the flat outer films and the at least two inner thermoformed films are made from a polypropylene copolymer and inner layers of the flat outer films and the at least two inner thermoformed films are made of a polypropylene homopolymer.

11. The honeycomb sandwich sheet or panel according to claim 1, further comprising an inner flat thermoformed film disposed between the first inner thermoformed film and the second inner thermoformed film and welded thereto.

* * * * *